United States Patent [19]

Chang

[11] Patent Number: 5,570,624
[45] Date of Patent: Nov. 5, 1996

[54] STRUCTURE OF PERCOLATOR

[76] Inventor: Kwei-Tang Chang, No. 14, Lane 54, Luong Chung St., Panchiao City, Taipei Hsien, Taiwan

[21] Appl. No.: 597,867

[22] Filed: Feb. 7, 1996

[51] Int. Cl.⁶ ............................... A47J 31/00; A47J 31/10
[52] U.S. Cl. ................... 99/285; 99/288; 99/308; 99/323
[58] Field of Search ................ 99/279, 280, 283, 99/282, 281, 304–306, 308, 309, 312, 302 R, 288, 299, 323; 219/441, 439, 515; 392/445, 458, 467

[56] References Cited

U.S. PATENT DOCUMENTS

| | | | |
|---|---|---|---|
| 3,602,129 | 8/1971 | Cherre | 99/282 |
| 3,682,089 | 8/1972 | Unger et al. | 99/281 |
| 3,696,733 | 10/1972 | Beverett | 99/307 |
| 3,908,530 | 9/1975 | Simon, Jr. et al. | 99/307 |
| 3,920,954 | 11/1975 | Dobson et al. | 219/441 |
| 3,939,760 | 2/1976 | Eaton, Jr. et al. | 99/312 |
| 4,138,936 | 2/1979 | Williams | 99/306 X |
| 4,401,014 | 8/1983 | McGrail et al. | 99/283 |
| 4,464,983 | 8/1984 | Chappell et al. | 99/312 |
| 4,512,246 | 4/1985 | Chappell et al. | 99/280 X |
| 4,622,889 | 11/1986 | Chappell et al. | 99/312 |
| 4,634,838 | 1/1987 | Berz | 99/304 X |
| 4,748,901 | 6/1988 | Burmeister | 99/306 |

*Primary Examiner*—Timothy F. Simone
*Attorney, Agent, or Firm*—Morton J. Rosenberg; David I. Klein

[57] ABSTRACT

A percolator which includes a base, an electric heating circuit mounted in the base, a pot having a top opening, a spout extending from the top opening, and an upright guide tube, a filter mounted in the top opening of the pot and coupled to the upright guide tube, a handle fixedly secured to the pot, and a lid for covering on the the top opening of the pot over the filter, wherein the pot has a circular bottom hole, a heat-conductive cap fastened to the circular bottom hole to hold the guide tube in the pot, and an annular bottom flange around the circular bottom hole; the base comprises a circular hot plate disposed in contact with the heat-conductive cap, an annular groove disposed around the circular hot plate and forced into engagement with the annular bottom flange of the pot, a wire groove around the periphery, and a plug holder at the periphery; the handle has two pivot holes aligned at the top; the lid has a pivot pivotably and detachably connected to the pivot holes of the handle.

2 Claims, 6 Drawing Sheets

STRUCTURE OF PERCOLATOR

BACKGROUND OF THE INVENTION

The present invention relates to percolators, and relates more particularly to such a percolator which includes a base with an electric heating circuit on the inside and a hot plate at the top, a pot detachably connected to the base at the top to hold a guide tube on the inside, a filter mounted in the pot at the top, a handle fixedly secured to the pot at the top, and a lid pivoted to the handle and covered on the filter.

Various percolators have been disclosed for percolating coffee, and have appeared on the market. FIG. 1 shows a regular percolator which comprises a base 2A, which has an electric heating circuit on the inside, a pot 1A fixedly secured to the base 2A at the top, a filter (not shown) mounted in the pot 1A at the top and covered by a lid, and a guide tube 3A vertically disposed inside the pot 1A for guiding boiling water through ground coffee in the filter. Because the pot 1A is fixedly secured to the base 2A, the user have to employ much effort when pouring prepared coffee out of the pot. When a percolator is used, an electric cable must be matched for connecting the electric heating circuit to a power supply outlet. However, regular percolators do not provide any receiving means for holding the electric cable. Furthermore, because the connecting area between the lid and the pot tends to be covered with dust, it must be regularly cleaned. However, because the lid is commonly designed not detachable, it is difficult to clean the connecting area between the lid and the pot.

SUMMARY OF THE INVENTION

The present invention has been accomplished to provide a percolator which eliminates the aforesaid drawbacks. It is one object of the present invention to provide a percolator which permits the pot to be detached from the base. It is another object of the present invention to provide a percolator which permits the lid to be detached from the pot for cleaning. It is still another object of the present invention to provide a percolator which has receiving means for receiving the electric cable.

According to one aspect of the present invention, the percolator comprises a base, an electric heating circuit mounted in the base, a pot having a top opening, a spout extending from the top opening, and an upright guide tube, a filter mounted in the top opening of the pot and coupled to the upright guide tube, a handle fixedly secured to the pot, and a lid for covering on the the top opening of the pot over the filter, wherein the pot has a circular bottom hole, a heat-conductive cap fastened to the circular bottom hole to hold the guide tube in the pot, and an annular bottom flange around the circular bottom hole; the base comprises a circular hot plate disposed in contact with the heat-conductive cap, an annular groove disposed around the circular hot plate and forced into engagement with the annular bottom flange of the pot, a wire groove around the periphery, and a plug holder at the periphery.

According to another aspect of the present invention, the handle has two pivot holes aligned at a top side thereof, the lid has a pivot pivotably and detachably connected to the pivot holes of the handle.

According to still another aspect of the present invention, the heat-conductive cap has a circular recess at the bottom side, the hot plate has a raised portion at the center fitted into the circular recess of the heat-conductive cap.

DETAILED DESCRIPTION OF THE PREFERRED EMBODIMENT

Figure 1:
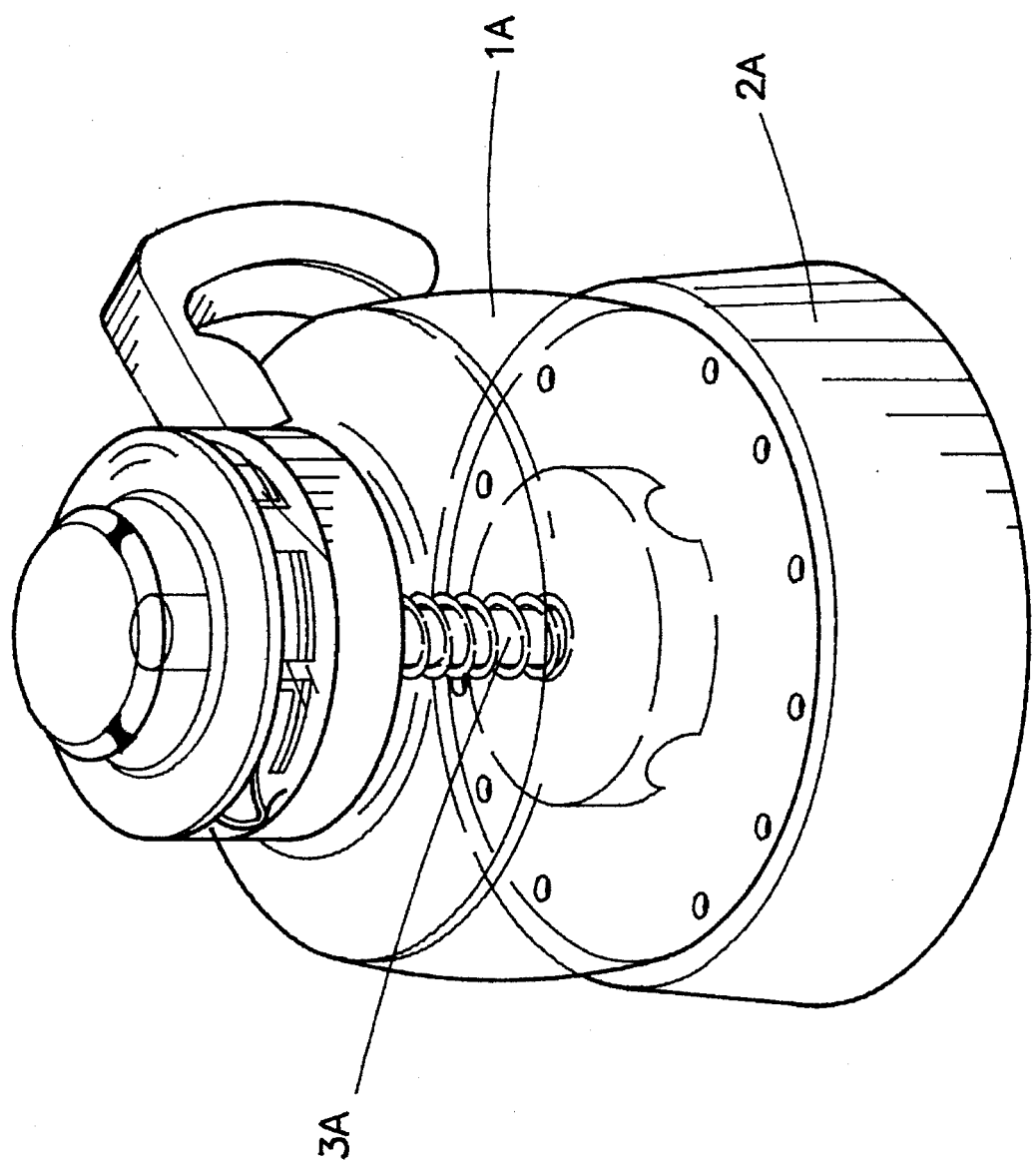
FIG. 1 is an elevational view of a percolator according to the prior art.
Figure 2:
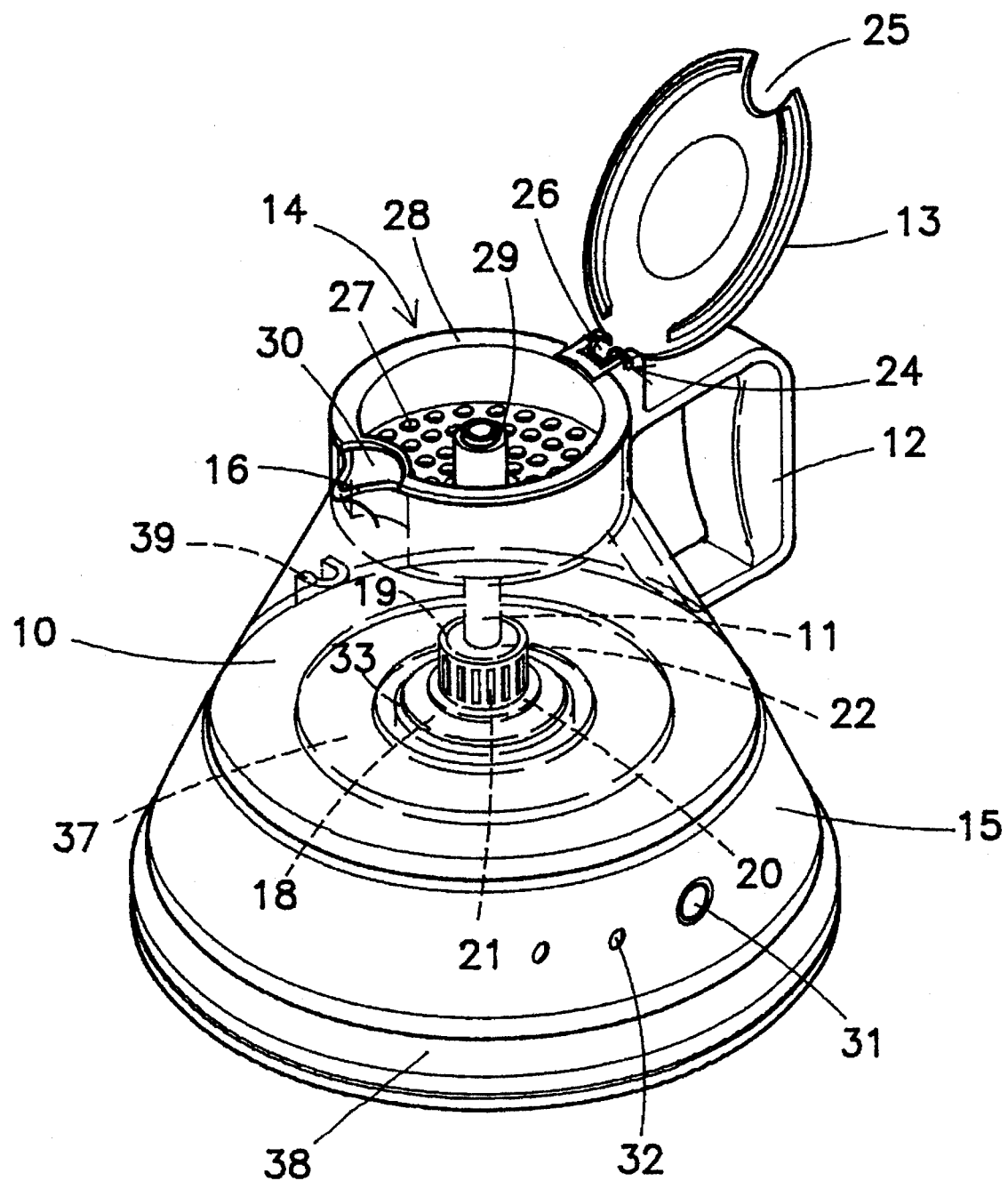
FIG. 2 is an elevational view of a percolator according to the present invention, showing the lip opened.
Figure 3:
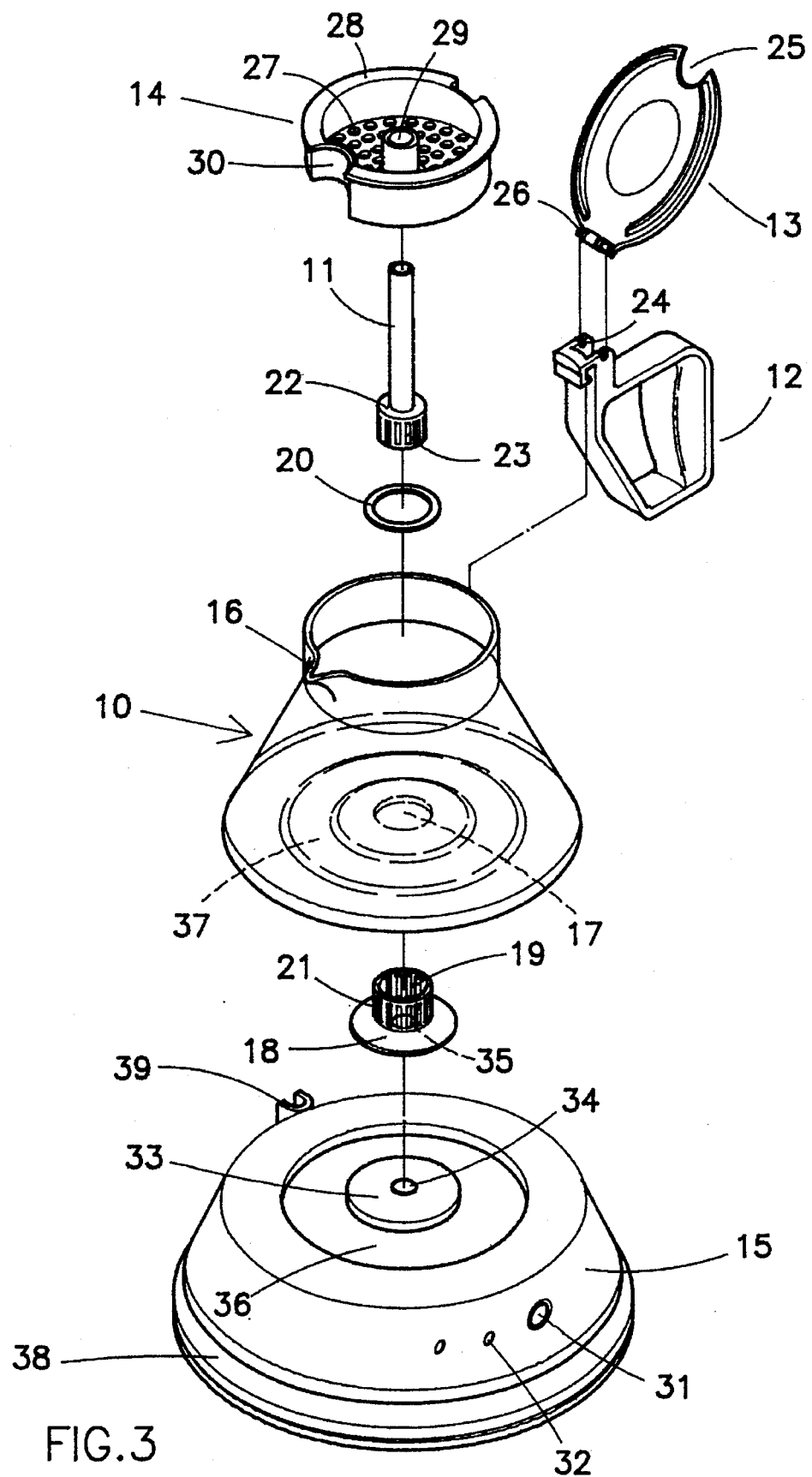
FIG. 3 is an exploded view of the percolator shown in FIG. 2.
Figure 4:
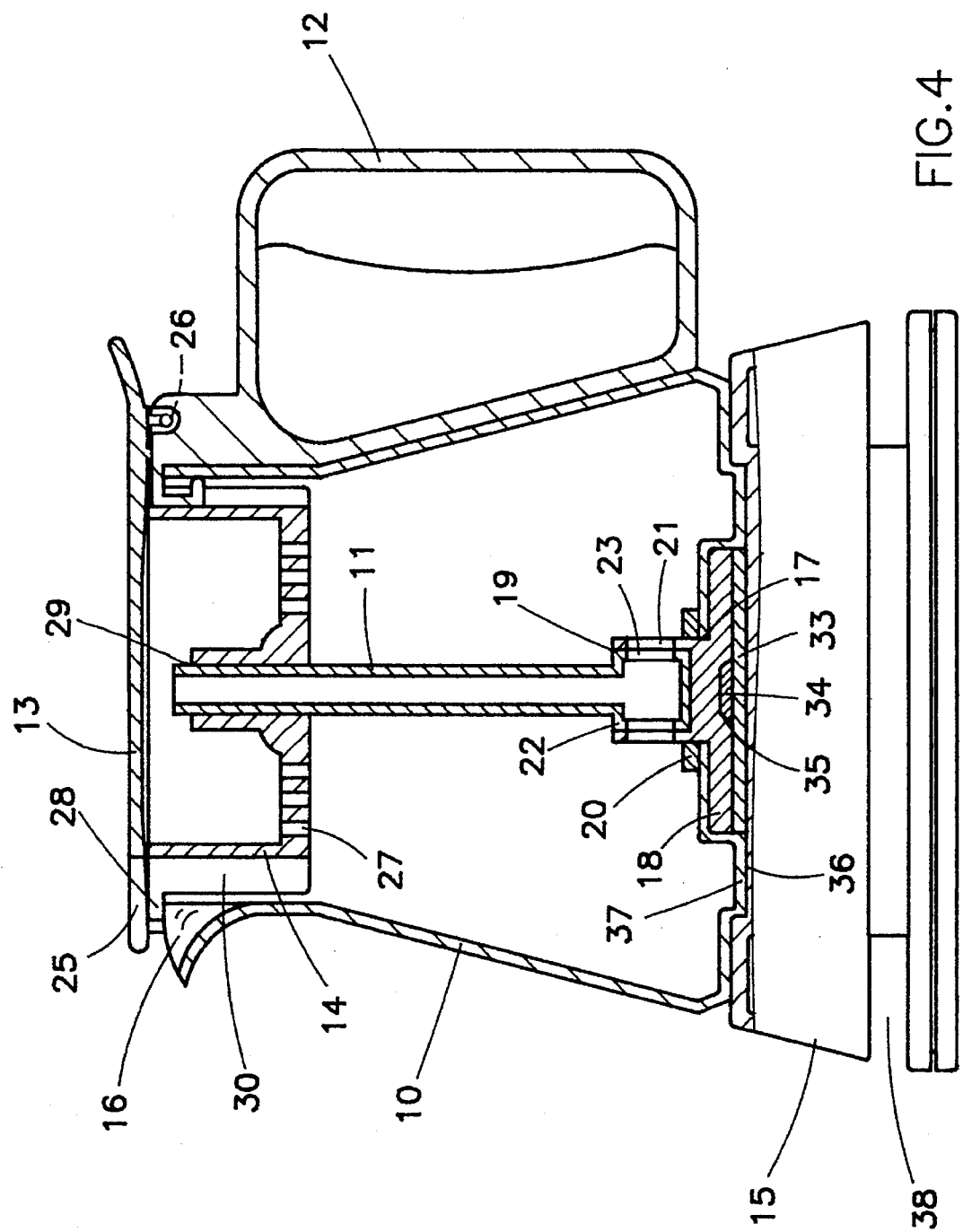
FIG. 4 is a sectional plain view of the percolator shown in FIG. 2.

Referring to FIGS. 2, 3, and 4, a percolator in accordance with the present invention is generally comprised of a pot 10, a guide tube 11, a handle 12, a lid 13, a filter 14, and a base 15.

Figure 5:
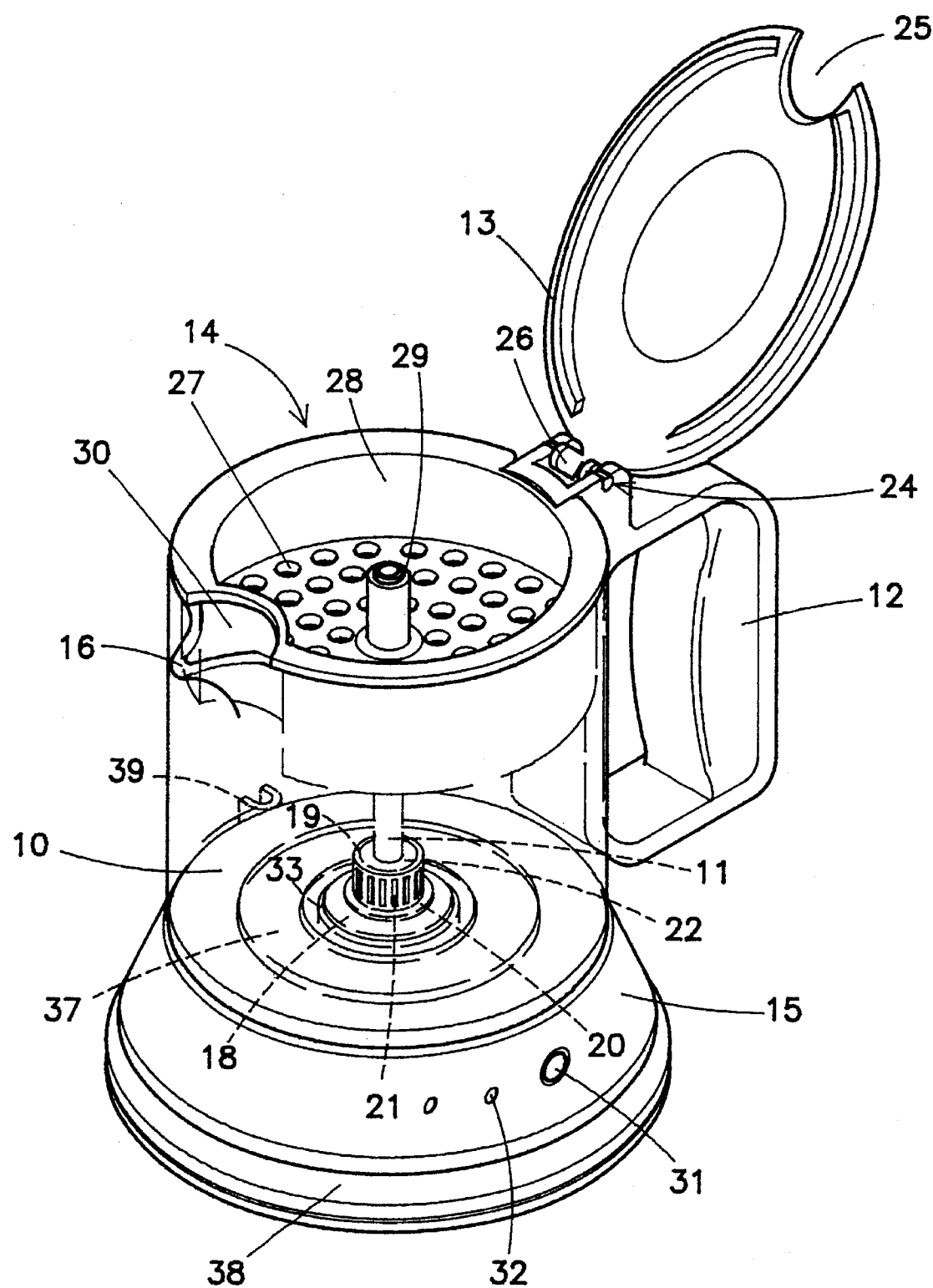
FIG. 5 shows an alternate form of the present invention.
Figure 6:
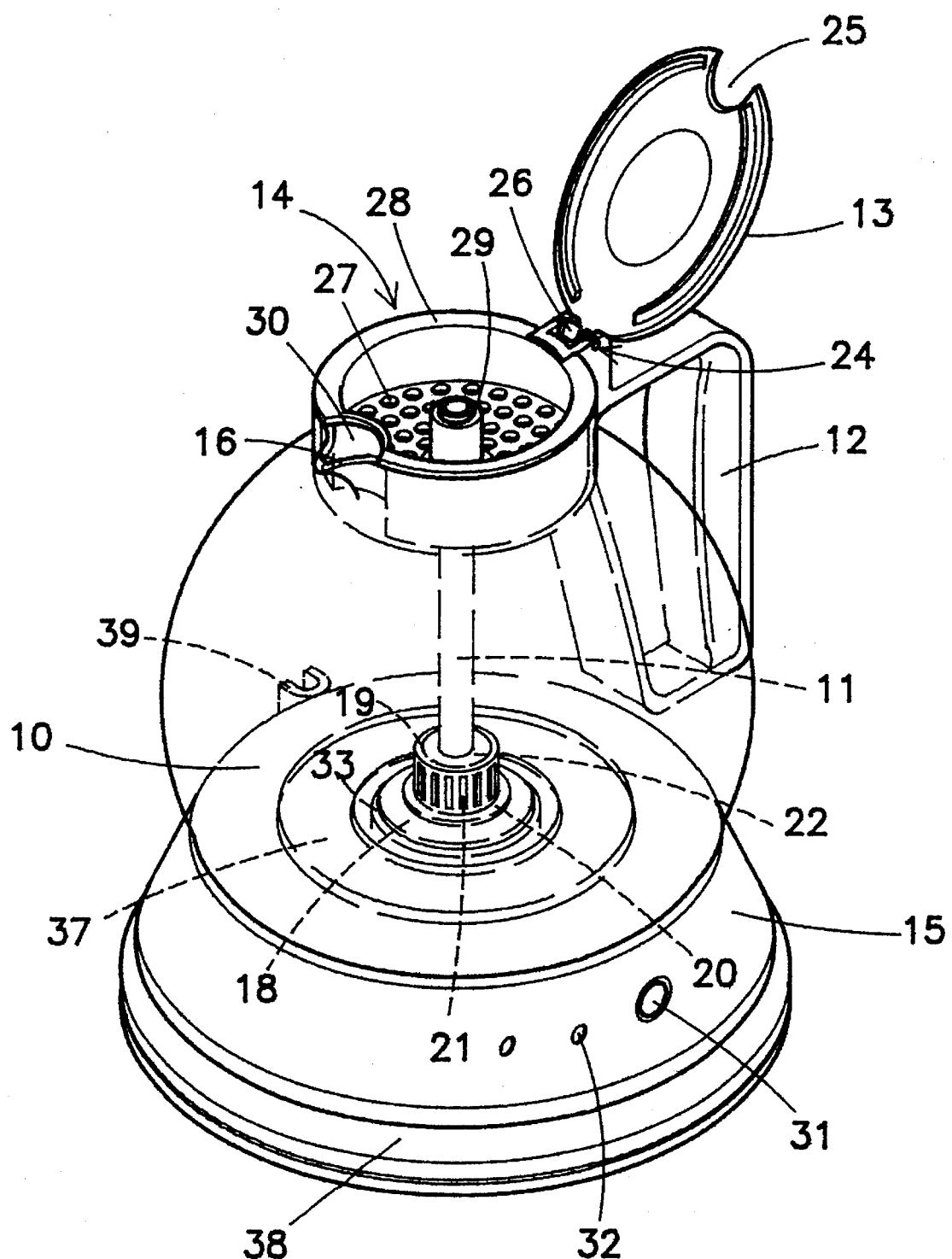
FIG. 6 shows another alternate form of the present invention.

The pot 10 is made from transparent glass, having a spout 16 at the top, a circular bottom hole 17 at the center of the bottom, and an annular flange 37 raised from the bottom on the outside around the circular bottom hole 17. A heat-conductive cap 18 is fastened to the circular bottom hole 17 of the pot 10. The heat-conductive cap 18 has a socket 19 raised from the top and secured to the circular bottom hole 17 by a locating ring 20, and a circular recess 35 at the center of the bottom side thereof. The socket 19 of the heat-conductive cap 18 has a plurality of through holes 21 through the periphery. During the installation of the socket 19 of the heat-conductive cap 18, a bonding agent may be applied to the connecting area between the heat-conductive cap 18 and the pot 10 to secure the connection. Furthermore, the pot 10 can be made of any of a variety of shapes. FIGS. 5 and 6 show two different shapes of the pot 10. The guide tube 11 has an expended coupling portion 22 at one end fitted into the socket 19 of the heat-conductive cap 18, and a plurality of through holes 23 through the expanded coupling portion 22. When the expanded coupling portion 22 of the guide tube 11 is fastened to the socket 19 of the heat-conductive cap 18, the guide tube 11 is erected in the pot 10 with its top end suspending in the open top of the pot 10. The handle 12 is fixedly secured to the top of the pot 10 at one side opposite to the spout 16, having horizontal pivot holes 24 aligned at the top. The lid 13 is covered on the open top of the pot 10, having a pivot 26 at the border pivotably connected to the pivot holes 24, and a notch 25 at the border opposite to the pivot 26. By disconnecting the pivot 26 from the pivot holes 24, the lid 13 is detached from the handle 12 for cleaning. The filter 14 is detachably mounted in the open top of the pot 10, having a plurality of pores 27 through the bottom, an outward flange 28 raised around the top and stopped above the open top of the pot 10, an upright sleeve 29 at the center sleeved onto the guide tube 11, and a side opening 30 matching the spout 16 for carrying off coffee from the pot 10. The base 15 comprises an electric heating element (not shown) on the inside, a power switch 31 and an indicator light 32 at the periphery, a hot plate 33 at the top, an annular groove 36 at the top around the hot plate 33 for receiving the annular flange 37 of the pot 10, a plug holder 39 at the periphery for holding the plug of the electric cable, and a wire groove 38 around the periphery near the bottom for the winding of the electric cable. The hot plate 33 has a raised portion 34 at the center for fitting into the circular recess 35 of the heat-conductive cap 18.

Referring to FIG. 4 and FIG. 2 again, when in use, the pot 10 is placed on the base 15 by coupling the heat-conductive cap 18 to the hot plate 33, and the power switch 31 is switched on to turn on the electric heating element of the base 15. When the electric heating element of the base 15 is turned on, heat is transmitted to the heat-conductive cap 18 through the hot plate 33 to boil water in the pot 10. When water in the pot 10 is boiled, hot water is forced upwards to pass through the through holes 21, 23 into the guide tube 11 and to further through ground coffee in the filter 14, and therefore the desired coffee is percolated. After percolation, the pot 10 is disconnected from the base 15, and percolated coffee is poured out of the pot 10 into a coffee cup for serving.

It is to be understood that the drawings are designed for purposes of illustration only, and are not intended as a definition of the limits and scope of the invention disclosed.

What the invention claimed is:

1. A percolator comprising a base, an electric heating circuit mounted in said base, a pot having a top opening, a spout extending from said top opening, and an upright guide tube, a filter mounted in the top opening of said pot and coupled to said upright guide tube, a handle fixedly secured to said pot, and a lid for covering on the the top opening of said pot over said filter, wherein said pot has a circular bottom hole, a heat-conductive cap fastened to said circular bottom hole to hold said guide tube in said pot, and an annular bottom flange around said circular bottom hole; said base comprises a circular hot plate at a top side thereof disposed in contact with said heat-conductive cap, an annular groove disposed around said circular hot plate and forced into engagement with the annular bottom flange of said pot, a wire groove around the periphery, and a plug holder at the periphery; said handle has two pivot holes aligned at a top side thereof; said lid has a pivot pivotably and detachably connected to the pivot holes of said handle.

2. The percolator of claim 1 wherein said heat-conductive cap has a circular recess at a bottom side thereof, said hot plate has a raised portion at the center fitted into the circular recess of said heat-conductive cap.

\* \* \* \* \*